3,357,833
PHOTOGRAPHIC EMULSIONS SENSITIZED
WITH CYANINE DYESTUFFS
Oskar Riester, Leverkusen, Germany, assignor to Agfa Aktiengesellschaft, Leverkusen, Germany, a corporation of Germany
No Drawing. Filed Mar. 12, 1964, Ser. No. 351,548
Claims priority, application Germany, Nov. 23, 1962, A 41,696
9 Claims. (Cl. 96—105)

This application is a continuation-in-part of application Serial No. 324,037, filed November 15, 1963.

The invention relates to novel polymethine dyestuffs of the rhodacyanine type and to silver halide emulsions, more especially emulsions containing color couplers, which are sensitized with these dyestuffs.

These dyestuffs have become important as sensitizers for photographic silver halide emulsions since they are particularly stable with respect to other additives, particularly to color couplers. They are described, for example, German Patents Nos. 890,249 and 921,668 or in British Patent No. 489,335. The class was later enlarged by the introduction into the methine chain of substituents which bring about distinct bathochromic shifts. The sensitization curves of all these dyestuffs have, however, the disadvantage of being highly unsymmetrical: apart from the main maximum, there is a secondary maximum at shorter wavelength. This secondary sensitization is undesirable in color photography, since it impairs sharp separation of the sensitivities. This obviously applies not only to the multi-layer processes, but also to mixed-grain emulsions or screen processes, since selective sensitization is alway necessary for the individual regions of the spectrum. As an improvement, it has been proposed to use additional color filter layers which are intended to exclude this secondary sensitivity. Apart from the difficulty of finding filter dyestuffs which are satisfactry photographically and show the necessary intensity and correct position of the absorption, an additional layer also requires a considerable additional technical expenditure.

The present invention has for its object to modify the rhodacyanines in such a way that the secondary maximum disappears and the sensitization curve is, as far as possible, symmetrical, but the modified rhodacyanines are still capable of sufficient variation in order that the sensitization maximum can be adapted to the actual use, i.e., to the absorption maximum of a dyestuff image to be recorded.

It has now been found that these conditions are satisfied by dyestuffs of the following formula:

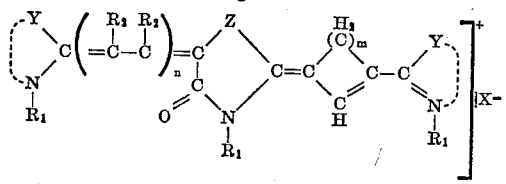

Wherein $R_1$ represents hydrogen atoms, alkyl groups, preferably with not more than 5 carbon atoms, which can be substituted by carboxyl, sulphonic acid, sulphonamide or hydroxyl groups, unsaturated alkyl groups with 2 to 5 carbon atoms, such as allyl or an aralkyl group such as benzyl, which can be substituted by a sulfonic acid group;

$R_2$ represents hydrogen atoms, alkyl, advantageously having 1 to 5 carbon atoms, aralkyl or aryl radicals, such as benzyl or phenyl;

$n$ represents 0, 1 or 2;

$m$ represents 1, 2 or 3;

X represents any anion which is usual in cyanine chemistry, such as chloride, bromide, iodide, perchlorate, thiocyanate, benzenesulfonate, p-toluene sulfonate, methylsulfate, ethylsulfate;

Y represents atoms or radicals necessary to complete a heterocyclic ring, which is usual in cyanine chemistry and such rings are advantageously oxazole, benzoxazole, thiazole, benzthiazole, thiodiazole, pyrimidine, pyroline, benzimidazole, tetrazole, azacycloheptamethylene, selenazole or benzselenazole, naphthoxazole, oxadiazole, pyridine, pyridiazine, quinoline, triazine, thiazine, triazole, triazoline, pyrazoline or indoline;

Z represents S, O, Se or >$NR_3$, whereby $R_3$ represents hydrogen or an alkyl radical, preferably having 1 to 5 carbon atoms.

The heterocyclic radicals can in their turn be substituted, for example, by alkyl groups, with advantageously up to 6 carbon atoms, cycloalkyl, such as cyclohexyl, aralkyl, such as benzyl, aryl, such as phenyl, or heterocyclic radicals, such as furyl or thienyl. Furthermore, they can be substituted by radicals such as hydroxyl, lower alkoxy, amino, substituted amino, halogen, trifluoromethyl, carboxyl or esterified carboxyl. They may further be condensed with aromatic or heterocyclic rings.

Such rhodacyanines are produced by quaternising in a manner known per se, the neutrocyanines of the general formula:

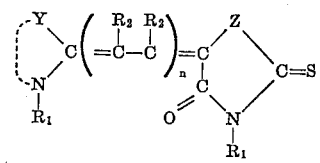

and reacting the resulting salt with such heterocyclic quaternary salts which have a Δ 1'-unsaturated cyclomethylene group in the 2-position:

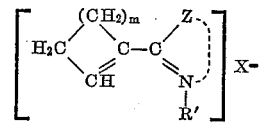

the various symbols having the meaning indicated above. The position of the sensitization maximum can be displaced almost as desired by varying the heterocyclic groups and so it is possible to achieve excellent adaption to the absorption of the dyestuff images to be reproduced from a colored original, for example, a colored negative film. The dyestuffs are added to the silver halide emulsion in known manner, e.g., as methanolic solutions. The quantity used is from 15 to 150 mg. per 120 gram of silver present as silver halide. The dyestuffs can also be used mixed with one another or with other sensitizers or non-sensitizing dyestuffs. They are particularly stable with respect to other emulsion additives, such as wetting agents, stabilizers, preservatives, plasticizers or hardeners, and in fact, their sensitizing intensity can sometimes even be increased by such additives as white toners of the type of diaminostilbene disulphonic acid.

According to one preferred embodiment of the invention, the rhodacyanines are used in emulsions containing color couplers. The color couplers can be incorporated into the emulsion in a soluble diffusion-resistant form. According to another method the color coupler is first dissolved in an inert high-boiling organic liquid, such as a phosphoric or aliphatic polycarboxylic acid ester, and this solution is then dispersed in a finely divided state throughout the emulsion.

The following compounds of the present invention are examples of rhodacyanine dyes which exhibit excellent utility:

| | Sensitization maximum (mμ) |
|---|---|
| 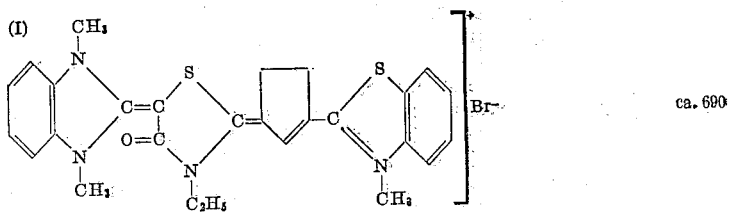 (I) | ca. 690 |
| 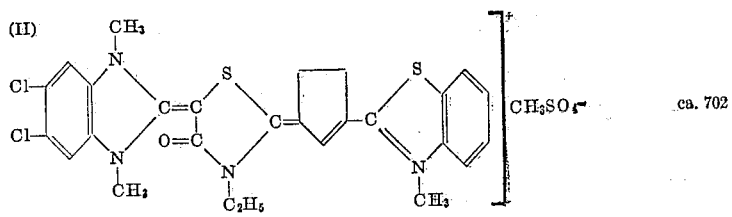 (II) | ca. 702 |
| 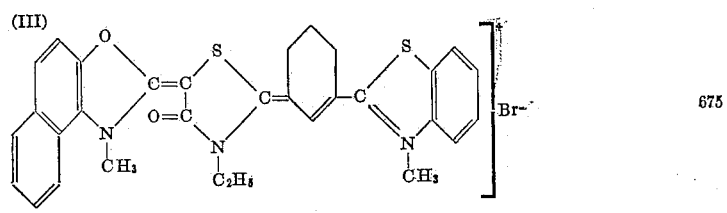 (III) | 675 |
| 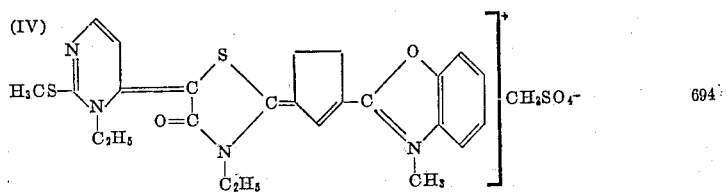 (IV) | 694 |
| 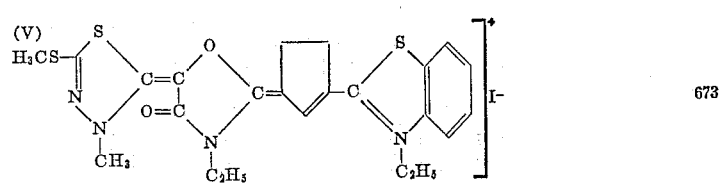 (V) | 673 |
| 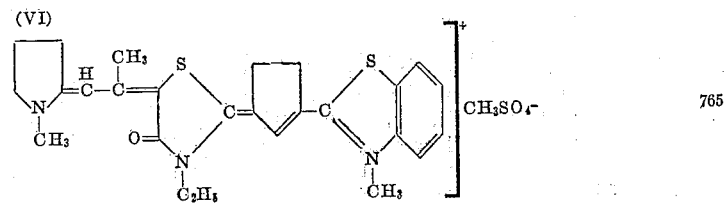 (VI) | 765 |
| 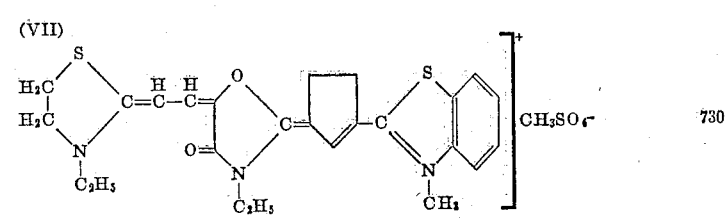 (VII) | 730 |
| 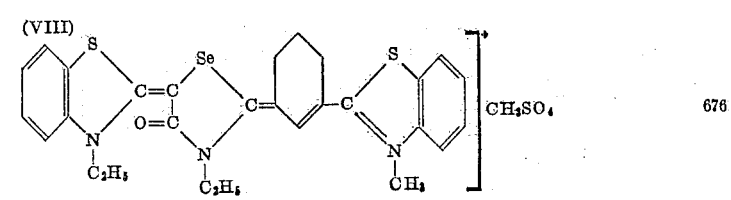 (VIII) | 676 |

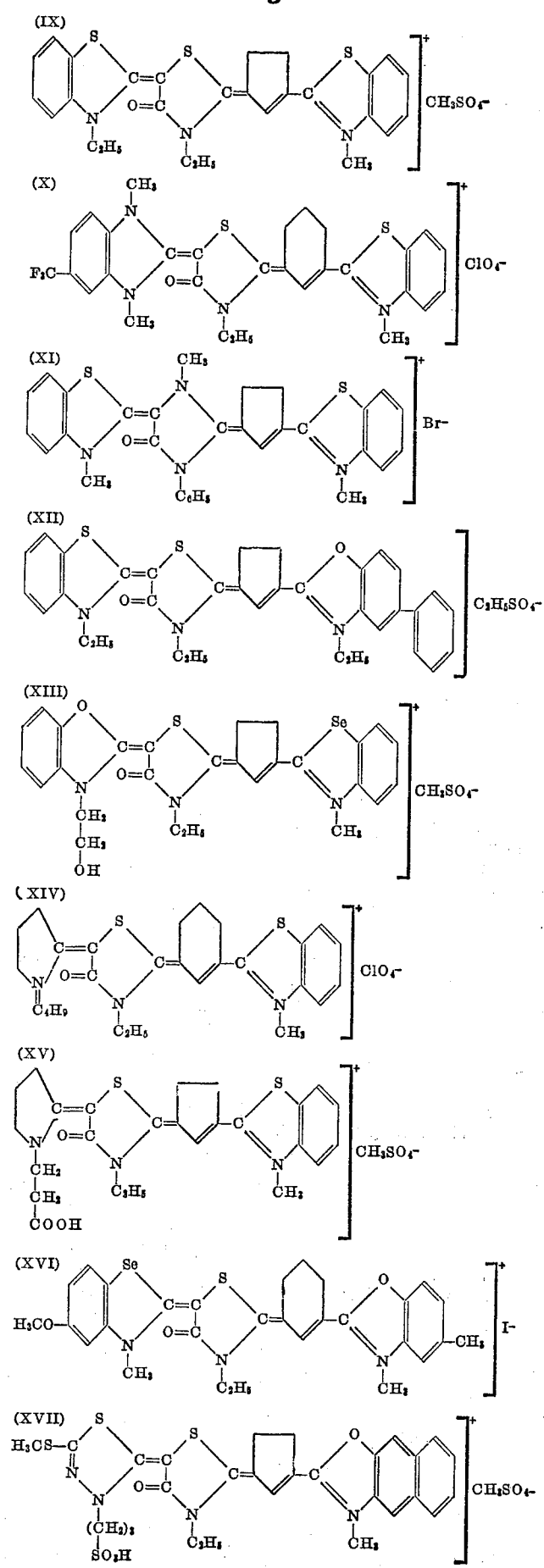
| | Sensitization maximum (mμ) |
|---|---|
| (IX) | 718 |
| (X) | 670 |
| (XI) | ca. 675 |
| (XII) | 677 |
| (XIII) | 690 |
| (XIV) | 660 |
| (XV) | 673 |
| (XVI) | 670 |
| (XVII) | 684 |

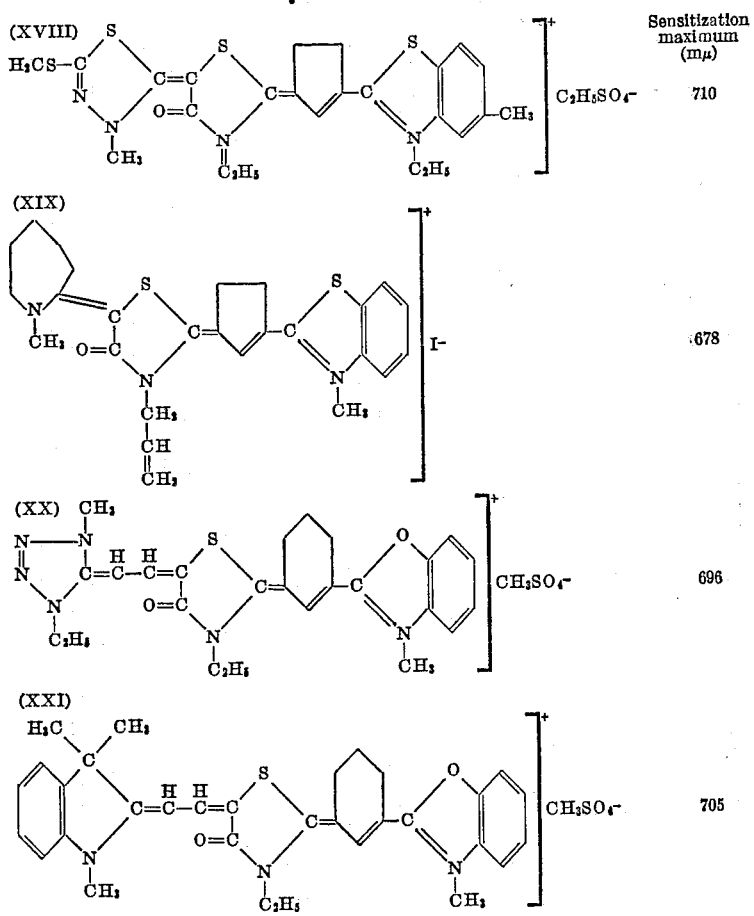

|  | Sensitization maximum (mμ) |
|---|---|
| (XVIII) | 710 |
| (XIX) | 678 |
| (XX) | 696 |
| (XXI) | 705 |

These dyestuffs are prepared as follows:

Dyestuff I 3 grams of 1,3-dimethyl benzimidazole-2,5'-(3'-ethyl-rhodanine) and 5 ml. of dimethyl sulphate are heated in an oil bath for 10 minutes at 100° C. After cooling to 100° C., 4 g. of 2-cyclopentenyl benzthiazole are added, and heated while stirring for 10 minutes at 80° C. After cooling to 20° C., the melt is triturated with 20 ml. of pyridine. 5 ml. of triethylamine are slowly added and the mixture is heated for another 10 minutes at 80° C. After cooling, the reaction solution is treated with ether and the ether is decanted. The dyestuff formed is dissolved in methanol and precipitated by adding potassium bromide solution.

Yield: 1 gram; M.P. 268–270° C.

Dyestuff II 1.9 grams of 1,3-dimethyl-5,6-dichlorobenzimidazole-2,5'-(3'-ethyl-rhodanine) are mixed with 1 gram of 2-cyclopentenyl benzthiazole and 3 grams of dimethyl sulphate and heated in an oil bath for 5 minutes at 100° C. while stirring, the internal temperature rising to 120° C. After cooling, the melt is triturated with 20 ml. of pyridine and 2.5 ml. of triethylamine and heated for another 10 minutes at 90° C. After cooling, the reaction mass is triturated with ether and glacial acetic acid and, after decanting, the residue is formed into a paste with 5 ml. of methanol; the dyestuff which crystallizes out is suction-filtered and washed with n-propanol. Yield: 1.5 grams; M.P. 255–260° C. with decomposition. The dyestuff can be recrystallized from methanol.

Dyestuff III 1.7 grams of 3-methyl-4,5-benzobenzoxazole-2,5'-(3'-ethyl-rhodanine) and 1.1 grams of 2-cyclohexenyl benzthiazole are heated with 4 ml. of dimethyl sulphate for 3 minutes at 120° C. While cooling, 10 ml. of pyridine are slowly added and the mixture is heated for another 10 minutes at 120° C. After cooling, the dyestuff is precipitated with 10 ml. of 25% potassium bromide solution and the crystals are suction-filtered and washed with propanol and ether. The crude dyestuff is crystallized from 300 ml. of methanol and 100 ml. of chloroform.

Yield: 1.3 grams; M.P. 261–262° C.

Dyestuff IV 1.5 grams of 1-ethyl-2-methyl mercaptopyrimidine-6, 5'-(3'-ethyl-rhodanine) and 1.1 grams of 2-cyclopentenyl benzoxazole are heated with 4 ml. of dimethyl sulphate for 2 minutes at 120° C. After cooling, 10 ml. of pyridine are added, the temperature being kept below 120° C. Finally, the mixture is heated for 5 minutes at 120° C. After cooling, the dyestuff, which has crystallized out is suction filtered and washed with isopropanol.

Yield: 1.7 grams; M.P. 278–291° C.

Dyestuff V 1.5 grams of 3-methyl-5-methylmercapto-1,3,4-thiodiazoline-2,5'-(3'-ethyloxazolidone-4-thione-2) and 3 grams of cyclopentenyl benzthiazole are heated with 3 ml. of diethyl sulphate for 5 minutes at 110° C. After cooling, 10 ml. of pyridine are slowly added, the temperature being kept below 110° C., and then the temperature is maintained for another 5 minutes at this level. After cooling, the melt is triturated with ether, the dyestuff is suction-filtered and washed with water and n-propanol. The yield is 0.5 gram. After dissolving in 100 ml. of methanol, 25 ml. of 25% potassium iodide solution are added. The dyestuff crystallizing out is suction filtered and washed with propanol and ether.

Yield: 0.3 gram; M.P. 252–254° C.

Dyestuff VI 2.8 grams of 1-methylpyrrolidone-2,5'-(isopropylidene-3'-ethyl-rhodanine) and 5 ml. of dimethyl sulphate are heated at 110° C. The temperature then rises to 140° C. After 5 minutes, the mixture is cooled to 100° C., 2 grams of 2-cyclopentenyl benzthiazole are added and the whole is heated for another 10 minutes at 105° C. After cooling, 20 ml. of pyridine and 3 ml. of triethylamine are added and the mixture is heated for 10 minutes at 90° C. After cooling, the dyestuff, which crystallizes out, is suction-filtered and washed with n-propanol and ether.

Yield: 2.3 grams; M.P. 235° C.

It is recrystallized from a mixture of 300 ml. of alcohol and 50 ml. of methanol.

Yield: 0.8 gram; M.P. 258–259° C.

Dyestuff VII 1.5 grams of 3-ethyl thiazolidine-2-ethylidene-5'-(3'-ethyloxazolidone-4-thione-2) and 3 ml. of dimethyl sulphate are heated for 10 minutes at 80° C. After adding 1.1 grams of cyclopentenyl benzthiazole, heating is continued for another 5 minutes at 120° C. After adding 20 ml. of acetic acid anhydride and 3 ml. of triethylamine, reaction is allowed to take place for 10 hours at room temperature. The dyestuff crystallizes out. It is suction-filtered and washed with propanol. After recrystallization from 30 ml. of methanol, there are obtained 0.2 gram of dyestuff with an M.P. of 247° C.

Dyestuff VIII 1.9 grams of 3-ethyl benzthiazoline-2,5'-(3'-ethyl selenorhodanine) and 1.1 grams of 2-cyclohexenyl benzthiazole are heated with 4 ml. of dimethyl sulphate for 3 minutes at 120° C. After cooling, 10 ml. of pyridine and 2 ml. of triethylamine are added and the mixture is heated for another 10 minutes at 120° C. The cooled melt is triturated with 30 ml. of ether. The ether is decanted and the residue, after trituration with 3 ml. of isopropanol, is crystallized. The crude yield is 1.4 grams; M.P. 259° C. After recrystallization from 250 ml. of methanol, there are obtained 0.85 gram; M.P. 266–267° C.

Dyestuff IX 3.2 grams of 3-ethyl benzthiazoline-2,5'-(3'-ethyl rhodanine) are heated with 5 ml. of dimethyl sulphate for 10 minutes at 140° C. In additional, 2 grams of 2-cyclopentenyl benzthiazole are heated with 1.3 grams of dimethyl sulphate at 110° C., the temperature rising to 125° C. The two quaternary salts are dissolved together in 20 ml. of pyridine and, after adding 1 ml. of triethylamine, stirred for 1 hour. The dyestuff which crystallizes out is suction filtered and washed with water until the filtrate is light-yellow. After brief flushing with n-propanol, the dyestuff is dried.

Yield 1 gram; M.P. 281–283° C.

After recrystallization from a mixture of 200 ml. of methanol and 100 ml. of chloroform, 0.95 gram are obtained; M.P. 291–293° C.

Dyestuff X 1.4 grams of 1,3-dimethyl-5-trifluoromethyl-2,5'-(3'-ethyl rhodanine) and 4 ml. of dimethyl sulphate are heated for 10 minutes at 160° C. After cooling to 120° C., 2 grams of 2-cyclohexenyl benzthiazole are added and the mixture is heated for another 2 minutes at 120° C. After cooling, 10 ml. of pyridine and 1 ml. of trimethylamine are added and the mixture is heated for 15 minutes at 120° C. After cooling, the mixture is triturated with ether, the ether is decanted off and the residue is dissolved in 50 ml. of water. 5 ml. of 50% sodium perchlorate solution are added and the precipitated dyestuff is suction filtered. It is dissolved in 30 ml. of methanol and the suction is left to crystallize. The crude yield is 0.9 g. After recrystallization from a mixture of 50 ml. of chloroform and 100 ml. of methanol, there are obtained 0.4 gram; M.P. 246–251° C.

Dyestuff XI 1.5 grams of 3-methyl benzthiazoline-2,5'-(1'-methyl-3'-phenyl thiohydantoin) and 2.5 ml. of dimethyl sulphate are heated for 5 minutes at 140° C. and then, after cooling to 100° C., 2 grams of 2-cyclopentenyl benzthiazole are added and the mixture is heated for another 5 minutes on the steam both. After cooling, 10 ml. of pyridine and 3 ml. of triethylamine are added and heating is continued for 10 minutes at 80° C. After cooling, the mixture is triturated with ether, the ether is decanted and the dyestuff precipitated with potassium bromide solution. The dyestuff is suction filtered, dissolved in methanol and, after adding 10 ml. of potassium bromide solution and 20 ml. of water, left for crystallization. After being suction filtered, the substance is washed with water, propanol and ether.

Yield: 0.2 gram; M.P. 201–202° C.

Dyestuff XII 1.4 grams of 3-ethyl benzthiazoline-2,5'-(3'-ethyl rhodanine), 1.4 grams of 2-cyclopentenyl-5-phenyl benzoxazole and 5 ml. of diethyl sulphate are heated for 10 minutes at 130° C. in an oil bath. After adding 10 ml. of n-propanol and 3 ml. of triethylamine, the mixture is heated for another 10 minutes on a steam bath. After cooling, the dyestuff is precipitated with ether and the ether is decanted. The residue is triturated with 10 ml. of methanol and the dyestuff is suction filtered. The dyestuff is recrystallized from 350 ml. of methanol.

Yield: 0.2 gram; M.P. 201–202° C.

Dyestuff XIII 2.9 grams of 3-hydroxyethyl-benzoxazoline-2-5'(3'-ethylrhodanine), 2.6 ml. of dimethylsulfate are heated together for 20 minutes at 150° C., 2.0 grams of 2-cyclopentenylbenzselenazole and 1.3 ml. of dimethylsulfate are heated together for 20 minutes at 150° C. The two melts are mixed and dissolved in 5 ml. of pyridine. After adding 2 ml. of triethylamine, the mixture is heated for 15 minutes at 80° C., the crystals which separate on cooling are sucked off and are washed with n-propanol and water. They are recrystallized from methanol-chloroform.

Yield: 0.5 gram; M.P. 295° C.

Dyestuff XIV

A mixture of 1.4 grams of 1-butyl-pyrrolidine-2-5'(3'-ethylrhodanine), 1.3 grams of 2-cyclohexenyl-benzthiazole and 2.5 ml. of dimethylsulfate are heated for 10 minutes at 120° C. After cooling to 80° C. there are added 10 ml. of pyridine, thereafter the mixture is heated for 10 minutes at 110° C. The dyestuff which has formed is precipitated with diethylether. It is then dissolved in n-propanol and precipitated by adding an aqueous solution of sodiumperchlorate. The dyestuff is sucked off and washed with ethylacetate.

Yield: 0.4 gram; M.P. 225° C.

Dyestuff XV

A mixture of 1.6 grams of 1-(ω-carboxyethyl)-pyrrolidine-2-5'(3'-ethylrhodanine) 1.3 grams of 2-cyclopentenyl-benzthiazole and 4 ml. of dimethylsulfate are heated on the steam bath to 100° C., whereby the reaction temperature rises to 140° C. After cooling the reaction mixture has added thereto 10 ml. of pyridine, whereby the temperature should not surpass 100° C. The reaction mixture is kept at this temperature for 5 minutes and thereafter the dyestuff is precipitated by means of ether.

Yield: 1.2 grams; M.P. 244° C.

Dyestuff XVI

A mixture of 1.9 grams of 3-methyl-5-methoxy-benzselenazoline-2-5'(3'-ethylrhodanine), 1.3 grams of 2-cyclohexenyl-5-methyl-benzoxazole and 1.5 ml. of dimethylsulfate are heated to 120° C. for 5 minutes. The reaction mixture is cooled to 80° C. and has added thereto 30 ml. of propanol and 3 ml. of triethylamine after 5 minutes. There is added once more 2 ml. of triethylamine to the reaction mixture, whereafter the latter is kept for 5 minutes at 80° C. The dyestuff is precipitated with ether and recrystallized from methanol.

Yield: 1.3 grams; M.P. 239–253° C.

Dyestuff XVII

A mixture of 2.1 grams of 3-(ω-sulfonicacidpropyl)-5-methylmercapto - thiodiazole(1,3,4) - 2,5'(3'-ethylrhodanine), 2.4 grams of 2-cyclopentenyl-5,6-benzo-benzoxazole and 4.0 ml. of dimethylsulfate are heated for 5 minutes to 120° C. After cooling to room temperature the melt is dissolved in 10 ml. of acetic acid anhydride and 4 ml. triethylamine. After 30 minutes there are added once more 4 ml. of triethylamine to the reaction mixture and the latter is stirred for 15 minutes at 20° C. The dyestuff which crystallizes out of the recation mixture is washed with n-propanol.

Yield: 1.5 grams; M.P. 282–284° C.

Dyestuff XVIII

A mixture of 1.3 grams of 3-methyl-5-methylmercapto-thiodiazole (1,3,4)-2,5'(3'-ethylrhodanine), 1.1 grams of 2-cyclopentenyl-5-methyl-benzthiazole and 5 ml. of diethylsulfate are heated for 15 minutes to 130° C. After cooling to 80° C. there are added 10 ml. of pyridine to the reaction mixture, whereby the temperature rises to 130° C. The dyestuff which crystallizes during cooling is sucked off and washed with acetone. It is recrystallized from methanol and boiled out with ethyl acetate.

Yield: 2.1 grams; M.P. 291–293° C.

Dyestuff XIX

A mixture of 1.7 grams of 1-methyl-aza-cycloheptylidene 2,5'-(3'-allylrhodanine), 1.4 grams of 2-cyclopentenylbenzthiazole and 3 ml. of dimethylsulfate are heated for 5 minutes at 120° C. After cooling to room temperature the reaction mixture has added thereto 10 ml. of pyridine, whereby the reaction temperature should not surpass 120° C. After adding 1 ml. of triethylamine, the reaction mixture is heated for 5 minutes on the steam bath. Thereafter it is cooled to room temperature. Then the dyestuff is precipitated with ether. Is is dissolved in 5 ml. ethanol and precipitated by means of an aqueous solution of potassium iodide. The dyestuff is recrystallized from methanol.

Yield: 1 gram; M.P. 234° C.

Dyestuff XX

Aa mixture of 1.5 grams of 1-methyl-3-ethyl-tetrazoline-2-dimethine-5'-(3'-ethylrhodanine), 1.1 grams of 2-cyclohexenylbenzoxazole and 5 ml. of dimethylsulfate are heated on a steam bath for 5 minutes, whereby the temperature of the reaction mixture rises to 105° C. After cooling to room temperature the reaction mixture has added thereto 5 ml. of acetic acid anhydride and 3 ml. of triethylamine. After heating to 75° C. the mixture has added thereto further 2 ml. of triethylamine. It is then kept for further 15 minutes at this temperature. The dyestuff which has formed precipitates during cooling. It is sucked off, washed with water and n-propanol and recrystallized from ethanol.

Yield: 1.2 grams; M.P. 236° C.

Dyestuff XXI

A mixture of 1.7 grams of 1,3,3-trimethylindolenine-2-dimethine-5'-(3'-ethylrhodanine), 1.1 grams of 2-cyclohexenylbenzoxazole and 2 ml. of dimethylsulfate are heated for 5 minutes at 120° C. After cooling the reaction mixture has added thereto 10 ml. of pyridine, whereby the temperature should not surpass 100° C. The mixture is kept for further 5 minutes at 100° C. and is then cooled to room temperature. The dyestuff which crystallizes is sucked off and washed with propanol and ethyl acetate.

Yield: 1.6 grams; M.P. 262–263° C.

After recrystallization from 150 ml. of ethanol the yield is 1.2 grams; M.P. 264° C.

Photographic example

The sensitization of a silver halide emulsion is effected in the known manner, for example, by dissolving 13 mg. of the Dyestuff I in 3000 times the quantity of methanol and stirring the resulting solution into 1 liter of a silver chlorobromide gelatin emulsion at 40° C. After adding the usual additives, such as wetting agents, hardeners, stabilisers, 10 g. of a color coupler for cyan, e.g., sodium-1-hydroxy-2-naphthoic acid stearyl-amide-4-sulphonate, is added as a 5% solution in water. After adding water, the required viscosity is adjusted and this mixture is cast onto a barytocoated paper and dried. The light-sensitive layer is exposed to light and developed in a color forming developer in known manner. There is obtained a spectral sensitization, the curve of which is substantially more symmetrical than that which is obtained with the conventional rhodacyanine

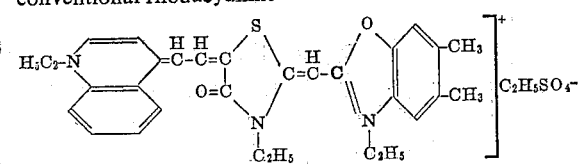

I claim:

1. A light-sensitive photographic material comprising a supported light-sensitive silver halide emulsion layer which contains in an effective amount a sensitizing dye of the following formula:

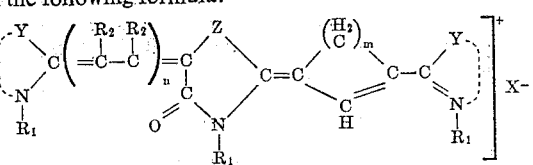

wherein $R_1$ represents a radical of the group consisting of hydrogen, alkyl, unsaturated alkyl, alkyl substituted by a radical of the group consisting of carboxyl, sulfo, sulfonamide, hydroxy, and phenyl; $R_2$ represents a member of the group consisting of lower alkyl, lower alkyl substituted by phenyl, and phenyl; Y represents the ring members necessary to complete a heterocyclic ring of the group consisting of oxazole, benzoxazole, thiazole, benzthiazole, thiodiazole, pyrimidine, pyrroline, benzimidazole, tetrazole, azocycloheptamethylene, selenazole, benzselenazole, naphthoxazole, oxadiazole, pyridine, pyridiazine, quinoline, triazine, thiazine, triazole, triazoline, pyrazoline, and indoline; Z represents a bivalent radical of the group consisting of —S—, —O—, —Se— and =NR_3; $R_3$ is a substituent of the group consisting of hydrogen and lower alkyl; X— is an anion; $n$ is an integer from 0 to 2 and $m$ is an integer from 1 to 3.

2. A light-sensitive photographic material as defined in claim 1, wherein the light-sensitive silver halide emulsion layer in addition contains a color coupler capable of reacting with the oxidation product of a primary aromatic amine developer to form a dye.

3. A light-sensitive photographic material as defined in claim 2, wherein the sensitizing dye has the following formula:

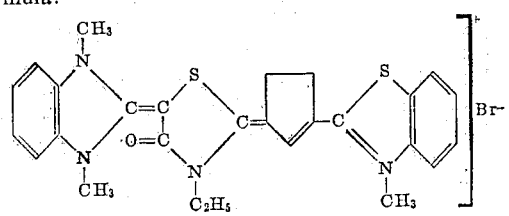

4. A light-sensitive photographic material as defined in claim 2, wherein the sensitizing dye has the following formula:

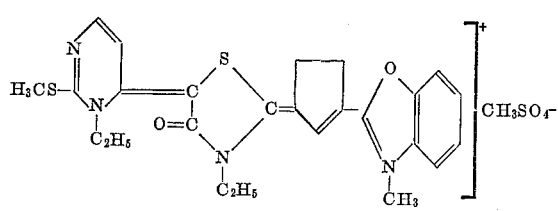

5. A light-sensitive photographic material as defined in claim 2, wherein the sensitizing dye has the following formula:

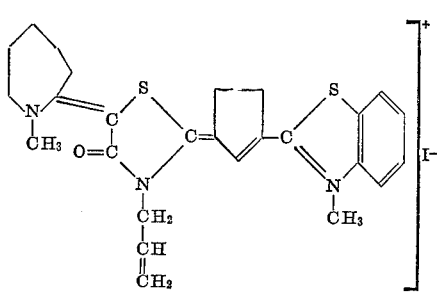

6. A light-sensitive photographic material as defined in claim 2, wherein the sensitizing dye has the following formula:

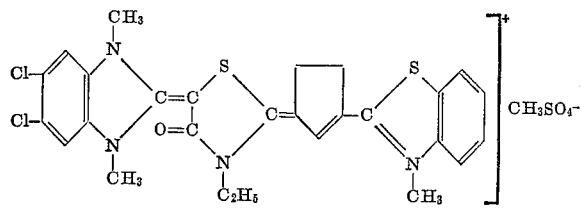

7. A light-sensitive photographic material as defined in claim 2, wherein the sensitizing dye has the following formula:

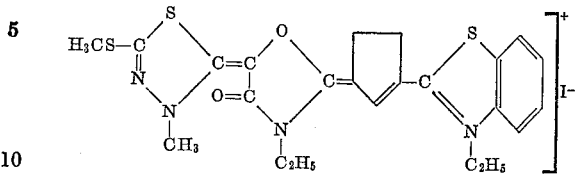

8. A light-sensitive photographic material as defined in claim 2, wherein the sensitizing dye has the following formula:

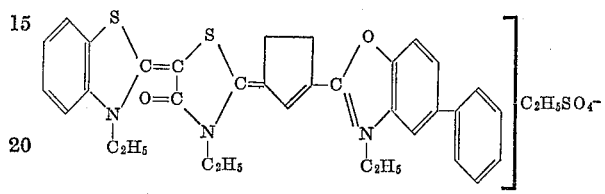

9. A light-sensitive photographic material as defined in claim 2, wherein the sensitizing dye has the following formula:

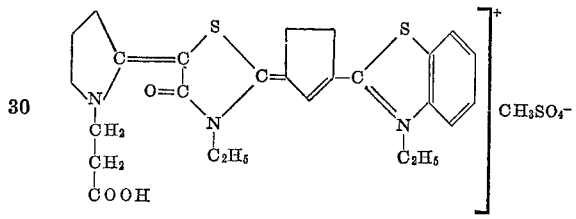

References Cited

UNITED STATES PATENTS 2,856,404  10/1958  Brooker et al. _____ 96—102
2,882,159  4/1959   Brooker et al. _____ 96—102

J. TRAVIS BROWN, *Primary Examiner.*
NORMAN G. TORCHIN, *Examiner.*